(12) United States Patent
Shun Chan

(10) Patent No.: US 6,697,901 B1
(45) Date of Patent: Feb. 24, 2004

(54) USING SECONDARY RESOURCE MASTERS IN CONJUNCTION WITH A PRIMARY RESOURCE MASTER FOR MANAGING RESOURCES THAT ARE ACCESSIBLE TO A PLURALITY OF ENTITIES

(75) Inventor: Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 503 days.

(21) Appl. No.: 09/696,434

(22) Filed: Oct. 24, 2000

(51) Int. Cl.$^7$ ............................................. G06F 12/00
(52) U.S. Cl. ........................ 710/200; 709/104; 714/2
(58) Field of Search .................... 710/200; 709/104; 714/2, 10, 11; 707/8, 202

(56) References Cited

U.S. PATENT DOCUMENTS

| | | | | |
|---|---|---|---|---|
| 5,003,464 A | * | 3/1991 | Ely | 714/10 |
| 5,339,427 A | * | 8/1994 | Elko et al. | 709/103 |
| 5,459,871 A | * | 10/1995 | Van Den Berg | 709/104 |
| 5,612,865 A | * | 3/1997 | Dasgupta | 700/79 |
| 5,734,909 A | * | 3/1998 | Bennett | 710/200 |
| 5,920,872 A | * | 7/1999 | Grewell et al. | 707/202 |
| 6,145,094 A | * | 11/2000 | Shirriff et al. | 714/11 |
| 6,272,491 B1 | * | 8/2001 | Chan et al. | 707/8 |
| 6,363,396 B1 | * | 3/2002 | Klots et al. | 707/103 Y |
| 6,529,906 B1 | * | 3/2003 | Chan | 707/8 |
| 6,571,206 B1 | * | 5/2003 | Casano et al. | 703/25 |

FOREIGN PATENT DOCUMENTS

| | | | | |
|---|---|---|---|---|
| EP | 0286807 A2 | * | 10/1988 | G06F/9/46 |
| EP | 0561381 A2 | * | 9/1993 | G06F/15/16 |
| EP | 0595453 A1 | * | 5/1994 | G06F/9/46 |
| EP | 0682312 A2 | * | 11/1995 | G06F/9/46 |
| EP | 0747814 A1 | * | 12/1996 | G06F/9/46 |
| JP | 363129428 A | * | 6/1988 | G06F/9/46 |
| JP | 407311741 A | * | 11/1995 | G06F/15/16 |

* cited by examiner

Primary Examiner—Xuan M. Thai
(74) Attorney, Agent, or Firm—Christian A. Nicholes; Hickman Palermo Truong & Becker LLP

(57) ABSTRACT

Techniques are disclosed for managing access to a set of one or more resources that are accessible to a plurality of entities. In one embodiment, one primary resource master and one or more secondary resource masters are established for a given resource. Each resource master (whether primary or secondary) is assigned to be the master for the resource for a corresponding subgroup of entities of the plurality of entities. Each secondary resource master is assigned to a parent resource master, which may either be the primary resource master or another secondary resource master. Each entity of the plurality of entities, upon seeking access to the resource, requests a lock on the resource from the resource master that is assigned to the subgroup that includes that entity. A secondary resource master communicates with its parent resource master for information regarding granting locks on the resource when the information maintained by that secondary resource master is insufficient for that secondary resource master to determine whether a particular lock on the resource can be granted. When the primary resource master fails, the secondary resource masters may continue to manage and grant locks for the resource as long as the granting of the locks does not require information that was only on the primary resource master.

32 Claims, 5 Drawing Sheets

USING SECONDARY RESOURCE MASTERS IN CONJUNCTION WITH A PRIMARY RESOURCE MASTER FOR MANAGING RESOURCES THAT ARE ACCESSIBLE TO A PLURALITY OF ENTITIES

FIELD OF THE INVENTION

The present invention relates generally to managing resources that are accessible to a plurality of entities and, more specifically, to distributing the job of mastery of a resource by one primary resource master to one or more secondary resource masters.

BACKGROUND OF THE INVENTION

Database servers use resources while executing transactions. Even though resources may be shared between database servers, many resources may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

The entity responsible for granting locks on resources is referred to as a lock manager. In a single node database system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager.

FIG. 1 is a block diagram of a multiple-node computer system 100. Each node is executing an instance of a database server and a portion of a distributed lock management system 132. Specifically, the illustrated system includes three nodes 102, 112 and 122 on which reside database servers 104, 114 and 124, respectively, and lock manager units 106, 116 and 126, respectively. Database servers 104, 114 and 124 have access to the same database 120. The database 120 resides on a disk 118 that contains multiple blocks of data. Disk 118 generally represents one or more persistent storage devices that may be on any number of machines, including but not limited to the machines that contain nodes 102, 112 and 122.

A communication mechanism allows processes on nodes 102, 112, and 122 to communicate with each other and with the disks that contain portions of database 120. The specific communication mechanism between the nodes and disk 118 will vary based on the nature of system 100. For example, if the nodes 102, 112 and 122 correspond to workstations on a network, the communication mechanism will be different than if the nodes 102, 112 and 122 correspond to clusters of processors and memory within a multi-processing machine.

Before any of database servers 104, 114 and 124 can access a resource shared with the other database servers, it must obtain the appropriate lock on the resource from the distributed lock management system 132. Such a resource may be, for example, one or more blocks of disk 118 on which data from database 120 is stored.

Lock management system 132 stores data structures that indicate the locks held by database servers 104, 114 and 124 on the resources shared by the database servers. If one database server requests a lock on a resource while another database server has a lock on the resource, the distributed lock management system 132 must determine whether the requested lock is consistent with the granted lock. If the requested lock is not consistent with the granted lock, then the requester must wait until the database server holding the granted lock releases the granted lock.

According to one approach, lock management system 132 maintains one master resource object for every resource managed by lock management system 132, and includes one lock manager unit for each node that contains a database server. The master resource object for a particular resource stores, among other things, an indication of all locks that have been granted on or requested for the particular resource. The master resource object for each resource resides within only one of the lock manager units 106, 116 and 126.

The node on which a lock manager unit resides is referred to as the "master node" (or simply "master") of the resources whose master resource objects are managed by that lock manager unit. Thus, if the master resource object for a resource R1 is managed by lock manager unit 106, then node 102 is the master of resource R1.

In conventional distributed lock manager systems, all requests for a resource go through the resource master of that resource. When the master of a resource exits normally or abnormally, the distributed lock manager system 132 has to select one or more of the remaining nodes to become the masters for the resources that were mastered by the terminated node. The process of rebuilding the master resource object at a new master node may involve collecting lock information for every remaining node in the distributed lock manager system 132. Consequently, the task of rebuilding the master resource objects that resided on a failed node may be time consuming. Further, the amount of time required for the task increases as the number of nodes and/or the number of resources increases.

Unfortunately, during the process of rebuilding master resource objects on other nodes, all lock operations are suspended on the resources that are being remastered. Thus, when a node fails, the resources that were mastered by that node may become unavailable for an extended period of time. The extended unavailability of those resources may be unacceptable.

Based on the foregoing, it is clearly desirable to provide techniques for improving resource management. In particular, it is desirable to provide techniques that increase the availability of resources while the resources are being remastered.

SUMMARY OF THE INVENTION

Techniques are disclosed for managing access to a set of one or more resources that are accessible to a plurality of entities. In one embodiment, one primary resource master and one or more secondary resource masters are established for a given resource. Each resource master (whether primary or secondary) is assigned to be the master for the resource for a corresponding subgroup of entities of the plurality of entities. Each secondary resource master is assigned to a parent resource master, which may either be the primary resource master or another secondary resource master.

Each entity of the plurality of entities, upon seeking access to the resource, requests a lock on the resource from the resource master that is assigned to the subgroup that includes that entity. A secondary resource master communicates with its parent resource master for information regarding locks on a resource when the information maintained by that secondary resource master is insufficient for that secondary resource master to determine whether a particular lock on the resource can be granted.

When the primary resource master fails, the secondary resource masters may continue to manage and grant locks for the resource as long as the granting of the locks does not require information that was only on the primary resource master.

A resource master may be assigned to a subgroup of entities based on various factors, such as system configurations, similarity of tasks performed by each entity in the subgroup of entities, similarity of performance speed of each entity in the subgroup of entities, similarity of distances from each entity to the resource master to which the subgroup that includes the entities is assigned, etc.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are disclosed for managing access to a set of one or more resources that are accessible to a plurality of entities. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
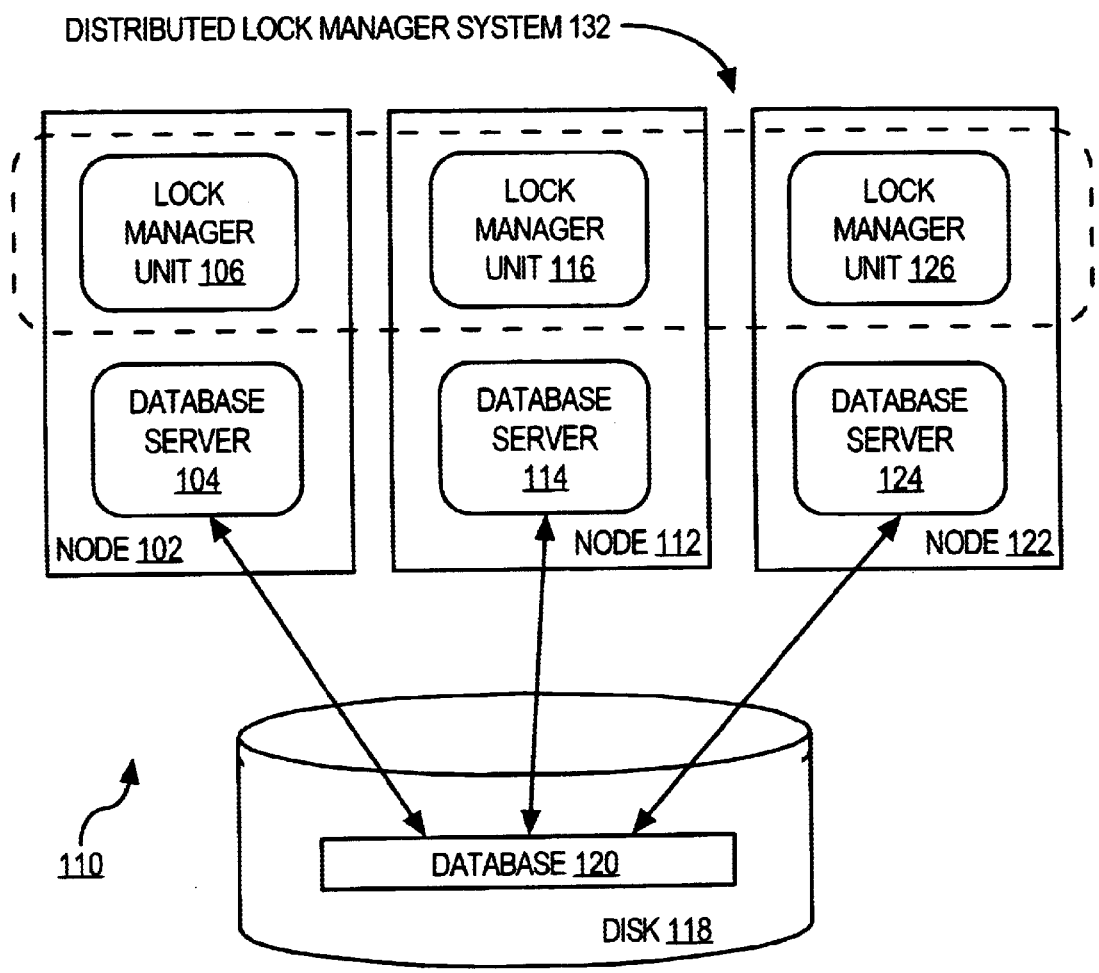
FIG. 1 is a block diagram showing a distributed lock manager system.
Figure 2:
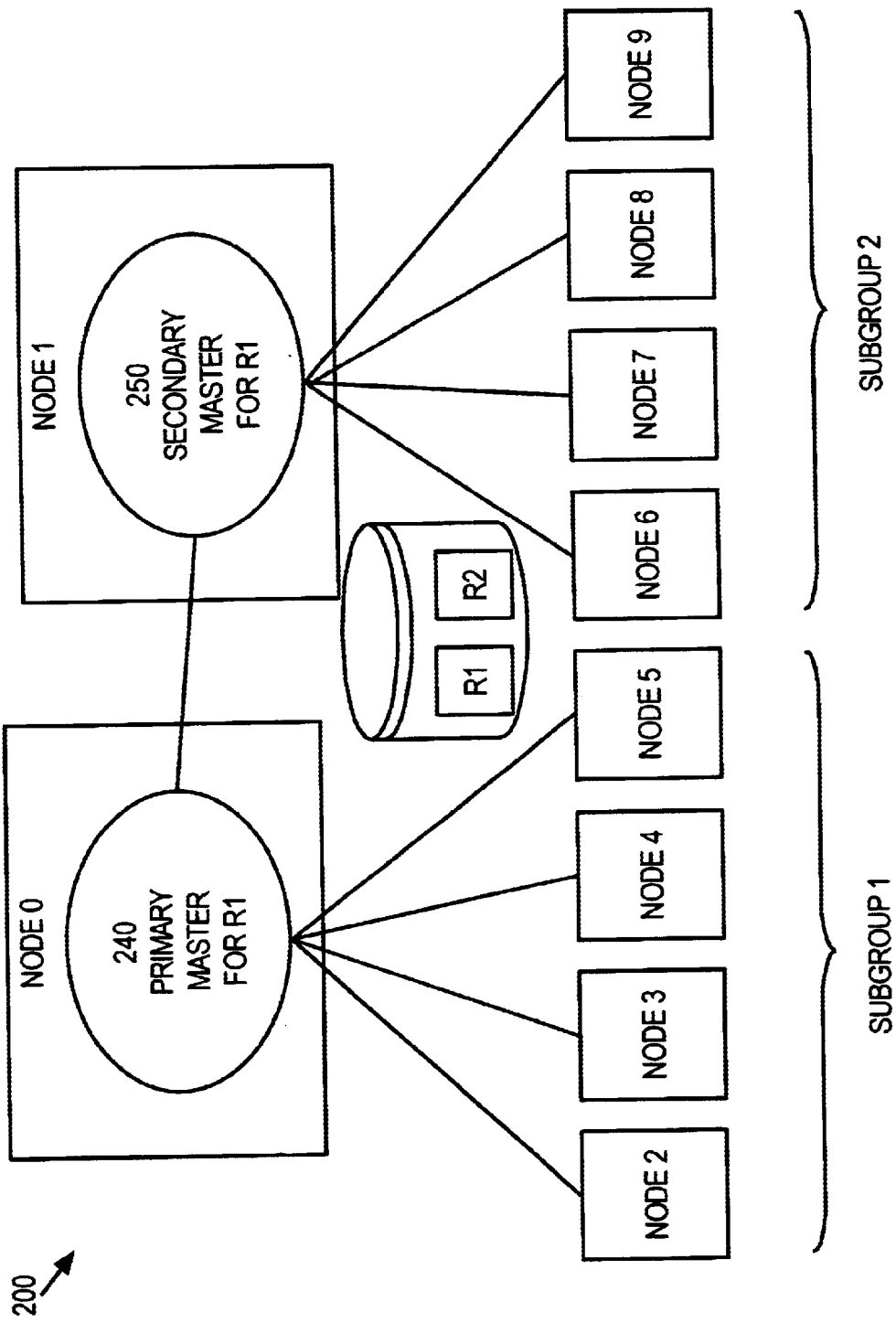
FIG. 2 is a block diagram showing a primary and a secondary master for a resource, according to an embodiment of the invention.

FIG. 2 shows a system 200 that includes a plurality of nodes 0 to 9, each of which has access to resource R1. Node 0 is executing a primary resource master 240 for a resource R1, and node 1 is executing a secondary resource master 250 for resource R1. In accordance with techniques of the invention, system 200 may have any number of nodes, and any number of secondary masters for each given resource. However, for illustration purposes, only one secondary master 250 for resource R1 is shown. As used herein, the term "resource master" refers to either a primary resource master or a secondary resource master of a resource.

In this example of FIG. 2, primary master 240 is assigned to be the resource master for R1 for nodes 0 and 2–5. Secondary master 250 is assigned to be the resource master for R1 for nodes 1 and 6–9. Primary master 240 is assigned to be the parent resource master for secondary master 250.

It should be noted that different resources within system 200 may have different primary and secondary masters. Consequently, primary master 240 and secondary master 250 only play the roles of primary master and secondary master, respectively, relative to a given set of resources. Other resources, also accessible to processes running on nodes 0 to 9, may have a completely different (1) primary master, (2) set of secondary masters, and (3) mapping of resource masters to nodes.

For example, node 5 may be the primary resource master for some resource R2, with nodes 2, 7 and 9 serving as secondary resource masters for resource R2. The primary resource master on node 5 may serve as the parent resource master for the secondary masters on nodes 2 and 7, while the secondary master on node 7 serves as the parent resource master for the secondary master on node 9. Further, node 2 may serve as the resource master for R2 for nodes 0, 1 and 2; node 5 may serve as the resource master for nodes 3, 4 and 5; node 7 may serve as the resource master for R2 for nodes 6 and 7; and node 9 may serve as the resource master for R2 for nodes 8 and 9.

To avoid confusion, during the following discussion, all nodes shall be identified based on their roles relative to resource R1, even though they may have entirely different roles relative to other resources.

Functional Overview

Nodes that are assigned to primary master 240 are herein referred to as subgroup 1 nodes, while nodes that are assigned to a secondary master are herein referred to as subgroup 2 nodes. In the present example, nodes 0 and 2 to 5 are subgroup 1 nodes, and nodes 1 and 6 to 9 are subgroup 2 nodes.

Generally, a process running on a given node seeking to obtain a lock to access R1 requests the lock from the resource master that is assigned to that given node. In the FIG. 2 example, any process running on subgroup 1 nodes sends lock requests for R1 to primary master 240, and any process running on subgroup 2 nodes sends lock requests for R1 to secondary master 250.

Each resource master only keeps track of the locks that it grants to (1) processes on the nodes for which it serves as the resource master, and (2) the secondary resource masters for which it is the parent resource master. Thus, primary master 240 only knows what has been granted to subgroup 1 nodes and to secondary master 250. Primary master 240 does not know the specifics of what secondary master 250 has granted to subgroup 2.

On the other hand, secondary master 250 only knows what has been granted to subgroup 2 nodes. Secondary master 250 does not know the specifics of what primary master 240 has granted to subgroup 1.

Handling a Lock Request

Figure 3:
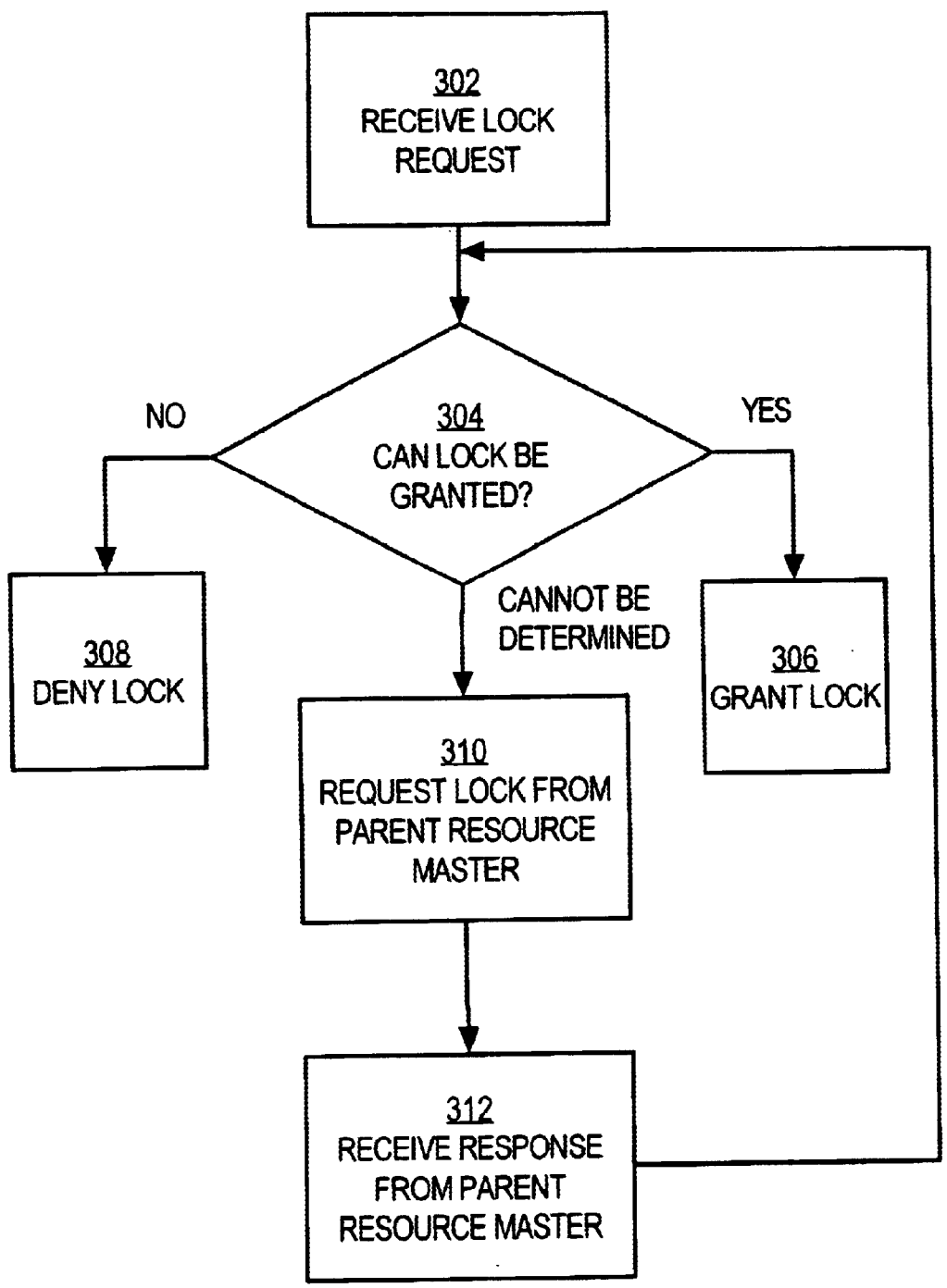
FIG. 3 is a flowchart illustrating steps for handling a lock request according to an embodiment of the invention.

FIG. 3 is a flowchart showing the steps performed by a resource master in response to receiving a request for a lock on a resource. At step 302, the resource master receives the lock request 302. At step 304, the resource master determines whether the lock can be granted based on the information maintained by the resource master.

If the resource master that received the request is the primary resource master for the resource, then the resource master will be able to determine whether the requested lock can be granted based on the information maintained by the resource master. On the other hand, if the resource master that received the request is a secondary resource master for the resource, then under certain conditions it is possible that the resource master is not able to determine whether the requested lock can be granted based on the information that it has for the resource.

If the lock can be granted, then control passes to step 306 and the lock is granted. According to one embodiment, when possible, a secondary resource master performs such lock grants without any communication with its parent resource master. For example, assume that node 6, seeking to acquire a share lock on R1, requests a shared lock from secondary master 250. If secondary master 250 has already granted a shared lock to any of the other subgroup 2 nodes, then secondary master 250 may grant the shared lock to node 6 without communicating with primary master 240. Under these circumstances, secondary master 250 knows that granting the requested shared lock will not conflict with any lock granted by primary master 240 because any lock granted by primary master 240 that would conflict with granting the current shared lock request would not have allowed the other shared lock to have been granted by secondary master 250.

If the lock cannot be granted, then control passes to step 308 and the lock is denied. If the resource master cannot determine whether the requested lock can be granted, then at step 310 the resource master requests a lock from its parent resource master.

Various situations may arise in which a secondary resource master is unable to determine, based on the locally stored lock information, whether a lock can be granted. For example, assume that node 6 requests a shared lock on R1 from secondary master 250. If secondary master 250 does not currently hold any lock on R1, then it is possible that, unbeknownst to secondary master 250, primary master 240 has granted an exclusive lock on R1 to some entity. If the primary master 240 has granted an exclusive lock on R1 to some entity, then the requested shared lock cannot be granted. If the primary master 240 has not granted an exclusive lock on R1 to any entity, then the requested shared lock can be granted.

At step 310, the resource master sends a lock request to its parent resource master. At step 312, the resource master receives a response from the parent resource master. The response includes the information required by the resource master to determine whether or not the lock request can be granted. For example, in step 310 secondary master 250 may send primary master 240 a request for a shared lock. If the primary master 240 has not granted any entity an exclusive lock on R1, then the message received back from primary master 240 will indicate that secondary master 250 has been granted a shared lock on R1.

If, on the other hand, primary master 240 has granted another entity an exclusive lock on R1, then the message received back from primary master 240 will indicate that secondary master 250 was denied a shared lock on R1.

After receiving the response from the parent resource master, control returns to step 304. At step 304, the resource master determines whether the requested lock can be granted. After receiving the response from the parent resource master, the secondary resource master will know whether the requested lock can be granted. For example, if secondary master 250 was granted the shared lock, then secondary master 250 knows that it can grant a shared lock to node 6, and control passes to step 306. On the other hand, if secondary master 250 was denied the shared lock, then secondary master 250 knows that it cannot grant the shared lock to node 6, and control passes to step 308.

Denying Block Request

Various techniques may be used to handle situations in which lock requests are denied. For example, the resource master may put the request on a request queue, and send a message to the entity that holds the lock that conflicts with the requested lock. When that entity releases the conflicting lock, the resource master moves the lock request from the request queue to a granted queue, and informs the requesting entity that it has been granted the requested lock.

In some cases, the entity that holds a conflicting lock may be a secondary resource master. When a secondary resource master receives from its parent resource master a message that it holds a conflicting lock, then the secondary resource master determines the entity to which it has granted the conflicting lock (which may be another secondary resource master). The secondary resource master then sends a message to that entity to inform that entity that it is blocking a lock request. When that entity releases the conflicting lock, the secondary resource master sends a message to its parent resource master to release the conflicting lock held by the secondary resource master.

In some circumstances, more than one entity may hold locks that prevent the grant of a lock request. For example, nodes 3, 6 and 8 may all hold shared locks on R1, and node 2 may request an exclusive lock. In response to the request, primary master 240 may send messages to node 3 and secondary master 250. Secondary master 250, in turn, may send messages to nodes 6 and 8. When nodes 6 and 8 release their shared locks on R1, secondary master 250 releases its shared lock on R1. When secondary master 250 and node 3 release their shared locks on R1, primary master 240 can grant the exclusive lock to node 2.

Benefits of Using Secondary Masters

The use of secondary masters provides many benefits relative to conventional lock management techniques. For example, the user of secondary masters increases the availability of the underlying resources in the event of a failure. In particular, the secondary masters of a resource can often continue to grant access to the resource even when the primary master for the resource is inoperative. For example, if secondary master 250 holds a shared lock on R1, then the secondary master 250 can still grant shared locks to the subgroup 2 nodes if primary master 240 becomes inoperative. Similarly, if secondary master 250 holds an exclusive lock on R1, then the secondary master 250 can continue to grant any form of lock to the subgroup 2 nodes if primary master 240 becomes inoperative.

Another benefit of using secondary masters is that, when the primary master is inoperative, information to build a new primary master is required from only the secondary masters and the nodes specifically assigned to the primary master. In the system shown in FIG. 2, a new primary master may be rebuilt from information obtained from secondary master 250 and from the nodes of subgroup 1. Nodes 6 to 9 need not be queried.

Further, because the amount of messages communicated between secondary master 250 and primary master 240 will typically be less than the amount of messages that would be communicated between any of the nodes and the primary master 240 if the were no secondary masters 250. In addition, as shall be described in greater detail hereafter, the secondary masters can be established in a manner that increases the efficiency of communication between processes that request locks and the nodes to which they must send their lock requests.

Selecting Secondary Masters

According to one aspect of the invention, techniques are provided for selecting which nodes to establish as secondary masters for a particular resource. Secondary masters may be selected based on various factors, including, for example, system configurations, and the amount of communications between a particular set of nodes and primary master 240.

In one embodiment, secondary masters are selected based on the benefits the added secondary masters provide to the efficiency of the system as a whole. For example, if a particular set of nodes is too far from a primary master, then a secondary master is selected to be responsible for that set of nodes. Preferably, a secondary master that is established for a set of nodes because the set of nodes is too far from the primary master would be closer to the set of nodes than the primary master. For example, nodes 1 and 6 to 9 may reside in a first building, while nodes 0 and 2 to 5 reside in a second building. If the network connections are such that nodes within the same building communicate with each other faster than they communicate with nodes in different buildings, then node 1 may be established to be the secondary master 250 for R1 so that the nodes in the first building do not have to always send their lock requests for R1 to the primary master 240 on node 0 in the second building.

A secondary master may also be established to increase the efficiency of the system when there is heavy traffic between a particular set of nodes and the primary master. If the traffic is too heavy, the communication channel between the nodes and the primary master may become a bottleneck to critical operations. Establishing a secondary master for that set of nodes reduces the traffic between the set of nodes and the primary master, thereby potentially eliminating the bottleneck.

In one embodiment, nodes are assigned to secondary masters based on the tasks that the nodes are performing. In particular, nodes that are performing similar tasks are assigned to the same secondary master. Similarly, a group of nodes that are frequently requesting a particular type lock, such as a share lock, may be assigned to one secondary master.

In yet another embodiment, nodes are assigned to secondary masters based on their network environment. For example, in some systems, some nodes are connected to a fast communication channel while other nodes are connected to a slower channel. Consider an environment consisting of several groups of instances with each group having its own master. Within a group, the instances are connected with fast communication channels, while groups are connected together with slower channels. Secondary masters may, in some cases, resolve requests within the same groups and thus eliminate a need to send a slow message to the primary master of a remote group.

Dynamic Secondary Master Creation

Secondary masters may be established statically or dynamically. A statically established secondary master is typically established as a secondary master by a user. For example, a user may specify that node 0 is to be the primary master of R1 and that node 1 is to be the secondary master of R1.

In contrast, a dynamically established secondary master is established as a secondary master during run-time in response to the occurrence of some event. For example, assume that no secondary master is initially established for R1. During run-time, nodes 1 and 6 to 9 may repeatedly request shared locks on R1. In response to the request frequency exceeding a particular threshold, primary master 240 may dynamically "delegate" lock management responsibility of R1 to node 1 for nodes 1 and 6 to 9, thus making node 1 the secondary master of R1 for nodes 1 and 6 to 9.

Locking Techniques

Techniques for dynamically establishing secondary masters will vary from implementation to implementation based on a variety of factors that may include the type of locking used by the system. Hash locking and DBA locking are two common locking techniques.

In a hash locking system, one lock covers all resources in a specified range. For example, assume that the resources are disk blocks. In a hash locking system, a single lock may cover 100 disk blocks. If a process requires a shared lock on fifty disk blocks that are all covered by the same lock, then the process only needs to request the one lock, rather than fifty locks for the fifty blocks. Thus, hash locking saves memory and reduces the number of lock requests that have to be made. However, hash locking has the potential to create false conflicts. For example, assume that the same hash lock covers both R1 and R2. A process that wants to modify R1 acquires the lock covering both R1 and R2 in exclusive mode. If another process wants to modify R2, it is denied access to R2 because the other process has the lock that covers R2, even though the process holding the lock is only interested in R1.

DBA locking prevents such false conflicts. In DBA locking, each lock covers a single resource. Since in DBA locking system one lock covers one resource, the above example would not create any conflict. In particular, the process that wants to modify R1 would have the exclusive lock for R1, and the process that wants to modify R2 would have the exclusive lock for R2.

Dynamically Establishing Secondary Masters in a Hash Locking System

According to one embodiment, resource masters in a hash locking system selectively delegate the responsibility of mastering the resources covered by a hash lock in response to granting the hash lock. For example, assume that (1) a system includes several nodes that have access to 1000 disk blocks, (2) a particular node N1 has been established as the primary master for the 1000 disk blocks, and (3) each hash lock initially covers 100 disk blocks.

Under these conditions, if another node N2 requests an exclusive lock (an "X" lock) on block 25 and no granted locks conflict with the request, then node N1 grants to node N2 an X lock that covers all of blocks 1–100. With this lock grant, node N1 may delegate the responsibility of mastering blocks 1–100 to N2, thus making N2 a secondary master for blocks 1–100.

Assume that a third node N3 wants to modify block 76. Node N3 will initially request an X lock on block 76 from N1, the primary master of block 76. Recognizing that the responsibility for mastering 76 has been delegated to node N2, node N1 directs node N3 to node N2 for the lock. Node N2 does not need block 76 so, according to one embodiment, node N2 breaks up the lock that covers blocks 1–100 into two or more smaller hash locks.

For the purpose of explanation, it shall be assumed that node N2 breaks the lock that covers blocks 1–100 into two locks, one of which covers blocks 1–50 and one of which covers blocks 51–100. Node N2 then retains an exclusive lock on the lock covering blocks 1–50, and grants an exclusive lock covering blocks 51–100 to node N3.

In addition to granting the exclusive lock of blocks 51–100 to node N3, node N2 may also delegate to node N3 the responsibility of mastering blocks 51–100. According to one embodiment, node N2 sends a message to the primary master N1 to inform N1 that mastery of blocks 51–100 have been delegated to N3.

If, later on, other processes on N2 request locks for blocks 26 and 30, then node N2 can grant the locks without any further communication with N1. Similarly, node N3 may grant locks on any blocks 51–100 without any further communication with N1 or N2. Thus, each node that holds exclusive locks acts as a secondary master relative to the resources covered by the exclusive locks that it holds.

Assume that processes on N3 repeatedly access blocks 78–100, and 60–76, and that a fourth node N4 requests an exclusive lock on block 78. Node N4 would initially send the request for block 78 to node N1. Node N1 refers node N4 to node N3. Since node N3 is using block 78, node N4 has to wait. When node N3 releases block 78, N3 may either (1) break up the lock covering blocks 51–100 in a way that allows N3 to assign block 78 to node N4, or (2) retain the lock covering blocks 51–100 until the entire lock can be assigned to node N4.

According to one embodiment, node N3 may, at this point, drop the hash lock that covers blocks 51–100 in exchange for individual locks on each of blocks 51–100. Node N3 may then grant to node N4 the exclusive lock for block 78.

According to one embodiment, nodes that do not know whether the lock for a resource has been delegated always request the lock for the resource from the primary master. However, once the primary master has informed a node of a delegation, the node sends any lock requests for resources directly to the node to which mastery of those resources has been delegated. Thus, node N4 will initially request the lock for block 78 from N1. However, having been informed that mastery of blocks 51–100 have been delegated to N3, N4 will direct all subsequent lock requests for any of blocks 51–100 to N3.

Figure 4:
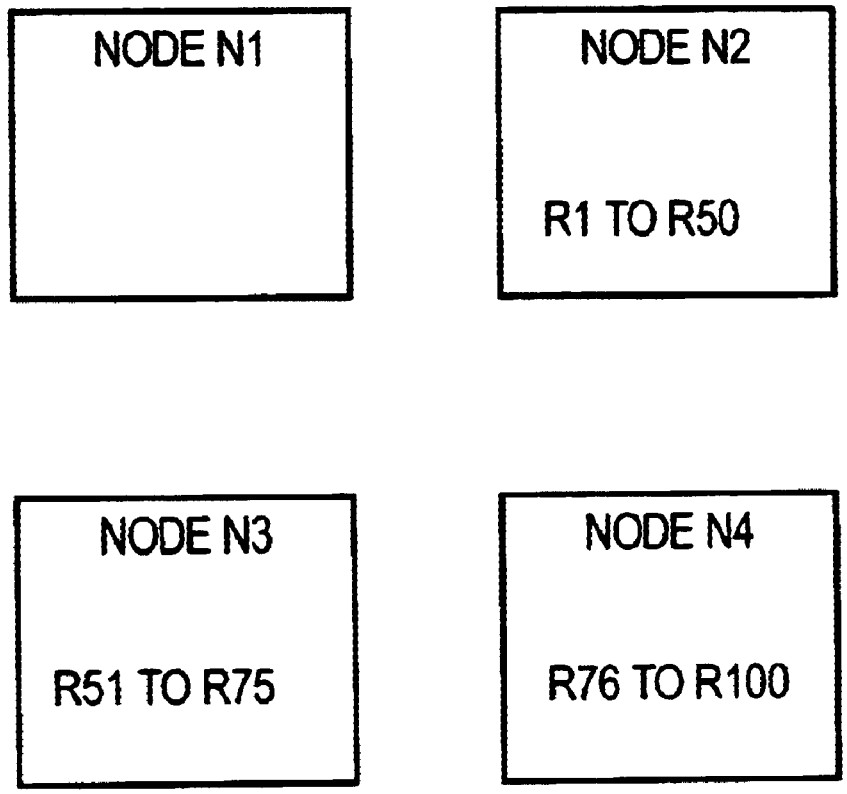
FIG. 4 is a block diagram illustrating the state of a system after various mastery responsibilities have been delegated according to an embodiment of the invention.

If node N3 does not need any of the blocks 76–100, node N3 can grant those blocks to node N4, and inform primary master N1 that node N4 is now master for blocks 76–100. At this point, the primary master N1 knows that N2 is mastering blocks 1–50, N3 is mastering blocks 51–75, and N4 is mastering blocks 76–100. FIG. 4 is a block diagram of a system with nodes N1, N2, N3 and N4 in this state.

Breakup Threshold

According to one embodiment, a break-up threshold is established. When determining whether to break up a hash lock in order to grant a lock on a requested resource, the resource master determines whether granting the lock would require the hash lock to be broken up into locks that cover less than the break-up threshold number of resources. If granting the lock would not require the hash lock to be broken up into locks that cover less than the break-up threshold number of resources, then the hash lock is broken up into hash locks that cover the break-up threshold number of resources. If, on the other hand, granting the lock would require the hash lock to be broken up into locks that cover less than the break-up threshold number of resources, then either the hash lock is not broken up at all, or the hash lock is broken up into locks that cover individual resources.

For example, assume that the break-up threshold is 25. Upon receiving a request for exclusive access to block 78, node N4 determines whether granting a lock on block 78 would require the lock held by N4 (which covers blocks 76–100) to be broken up into locks that cover less than 25 blocks. If granting the lock would not require the hash lock to be broken up into locks that cover less than 25 blocks, then the hash lock is broken up into hash locks that cover 25 blocks. If, on the other hand, granting the lock would require the hash lock to be broken up into locks that cover less than 25 blocks, then the hash lock is broken up into locks that cover individual resources. In the present example, the hash lock covering blocks 76–100 would have to be broken up into locks that cover less than 25 blocks in order to grant an exclusive lock on block 78. Therefore, N4 would break the hash lock that covers blocks 76–100 into locks covering each of blocks 76–100, and grant the exclusive lock for block 78 to the process that requested it.

Relinquishing Mastery

When nodes no longer require access to one or more resources, the nodes may relinquish mastery of those resources. For example, assume that node N3 no longer requires exclusive access to any of blocks 51–75. Node N3 may release the exclusive lock that covers blocks 51–75 and relinquish to the primary master N1 the mastery of those blocks. Node N4 may do the same for blocks 76 to 100. After both nodes N3 and N4 have relinquished their locks, node N1 will again be the master for blocks 51–100.

According to one embodiment, node N1 periodically inspects the locks that have been relinquished to it, and merges them when they satisfy some criteria. For example, after node N3 relinquishes mastery of blocks 51–75, node N1 will have a first lock covering blocks 51–75. After node N4 relinquishes mastery of blocks 76–100, node N1 will have a second lock covering blocks 76–100. Upon inspecting the locks held by node N1, node N1 may decide to merge the first and second locks to create a hash lock covering blocks 51–100.

Delegation Criteria

Various criteria may be used by a master to determine whether to delegate mastery of a resource or a range of resources to another node. According to one approach, each master may be configured to grant locks without delegating mastery until the number of locks granted by the master to a particular node exceeds a certain threshold.

For example, assume that node N1 is the primary master of blocks 1–100 and has not delegated mastery for any of the blocks. In response to node N2 requesting an exclusive lock on block 23, node N1 grants the exclusive lock but does not delegate master of block 23. If node N2 subsequently requests and obtains exclusive locks on a certain threshold percentage of resources in a range (e.g. 25% of the blocks in the 1–50 range), then node N1 may delegate mastery of that range of resources (e.g. blocks 1–50) to node N2.

According to one embodiment, the grant of exclusive locks may trigger the delegation of mastery, while the grant of shared locks does not. For example, even if node N2 obtains shared locks on 50% of the blocks in the 1–50 range, N1 may determine not to delegate mastery to node N2, even though mastery would have been delegated if node N2 had obtained exclusive locks on 50% of the blocks.

Hardware Overview

Figure 5:
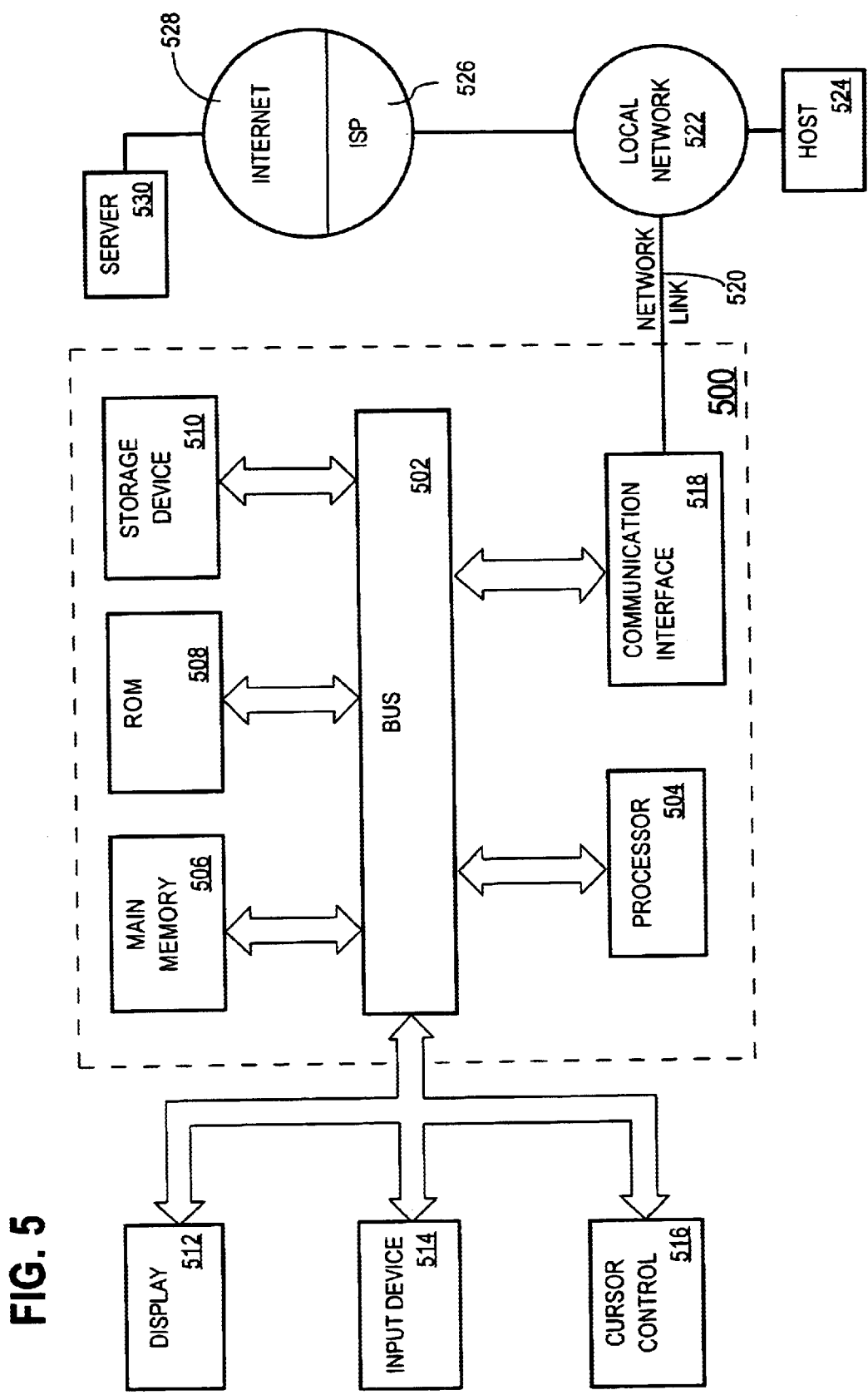
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing a set of one or more resources that are accessible to a plurality of entities, the method comprising the steps of:

providing a plurality of resource masters for said set of one or more resources; wherein said plurality of resource masters for said set of one or more resources include a primary master for said set of one or more resources and one or more secondary resource masters for said set of one or more resources;

dividing said plurality of entities into a plurality of subgroups; and assigning each subgroup of said plurality of subgroups to a corresponding resource master of said plurality of resource masters;

wherein an entity of said plurality of entities, upon seeking access to a resource in said set of one or more resources, requests a lock on said resource from the resource master that is assigned to the entity subgroup that includes said entity;

wherein each secondary resource master is assigned to a parent resource master; and wherein a secondary resource master of said plurality of resource masters communicates with the parent resource master to which that secondary master is assigned for information regarding granting locks on said resource when information maintained by said secondary resource master is insufficient for said secondary resource master to determine whether a particular lock on said resource can be granted.

2. The method of claim 1 wherein each resource master of said plurality of resource masters resides in one entity of said plurality of entities.

3. The method of claim 1 wherein each secondary resource master continues to grant locks to the subgroup of entities assigned to the secondary resource master when its parent resource master is inoperative if the information contained at the secondary resource master is sufficient for said secondary resource master to determine whether locks on said resource can be granted.

4. The method of claim 1 wherein the step of dividing is performed based on at least one factor in a list of factors that include:

system configuration;
similarity of tasks performed by said entities;
locations of said entities; and
similarity of performance speed of said entities.

5. A method for mastering resources, the method comprising the steps of:

mastering a plurality of resources at a first node;

dynamically delegating to a second node mastery of at least a first set of resources from said plurality of resources in response to occurrence of a first set of circumstances;

while mastery of said first set of resources is delegated to said second node, the first node causing lock requests received by said first node for resources in said first set of resources to be sent to said second node; and relinquishing mastery of said first set of resources from said second node to said first node in response to occurrence of a second set of circumstances.

6. The method of claim 5 wherein the first set of circumstances includes that said second node has obtained a set of locks for resources in said first set of resources.

7. The method of claim 6 wherein the first set of circumstances includes that said second node has obtained a set of exclusive locks for resources in said first set of resources.

8. A method for mastering resources, the method comprising the steps of:

mastering a plurality of resources at a first node;

dynamically delegating to a second node mastery of at least a first set of resources from said plurality of resources in response to occurrence of a first set of circumstances; and while mastery of said first set of resources is delegated to said second node, the first node causing lock requests received by said first node for resources in said first set of resources to be sent to said second node;

wherein the first set of circumstances includes that said second node has obtained a set of exclusive locks for resources in said first set of resources; and wherein the first set of circumstances includes that the number of exclusive locks obtained by said second node on resources in said first set of resources exceeds a threshold.

9. A method for mastering resources, the method comprising the steps of:

master ink a plurality of resources at a first node;

dynamically delegating to a second node mastery of at least a first set of resources from said plurality of resources in response to occurrence of a first set of circumstances;

while mastery of said first set of resources is delegated to said second node, the first node causing lock requests received by said first node for resources in said first set of resources to be sent to said second node; and selecting how many resources to include in said first set based on a threshold number.

10. A method for mastering resources, the method comprising the steps of:

mastering a plurality of resources at a first node;

dynamically delegating to a second node mastery of at least a first set of resources from said plurality of resources in response to occurrence of a first set of circumstances; and while mastery of said first set of resources is delegated to said second node, the first node causing lock requests received by said first node for resources in said first set of resources to be sent to said second node; wherein:

prior to delegating mastery of said first set of resources to said second node, a single lock covers said plurality of resources; and the method includes breaking said single lock into a plurality of locks to delegate mastery of said first set of resources to said second node.

11. The method of claim 10 further comprising the step of determining how to break said single lock into a plurality of locks based on a threshold number.

12. The method of claim 11 further comprising the step of breaking the single lock into locks that cover said threshold number of resources when said single lock can be broken into locks that cover said threshold number of resources.

13. The method of claim 5 wherein the second set of circumstances include that a set of one or more exclusive locks are released on said first set of resources.

14. The method of claim 5 wherein:
when mastery is relinquished to the first node, the first set of resources is covered by a first lock; and
the method further comprises the step of combining the first lock with a second lock that covers a second set of resources to produce a single lock that covers both the first set of resources and the second set of resources.

15. A method for mastering resources, the method comprising the steps of:
mastering a plurality of resources at a first node;
dynamically delegating to a second node mastery of at least a first set of resources from said plurality of resources in response to occurrence of a first set of circumstances;
while mastery of said first set of resources is delegated to said second node, the first node causing lock requests received by said first node for resources in said first set of resources to be sent to said second node; and
further comprising the following steps after dynamically delegating mastery of the first set of resources to the second node:
dynamically delegating to a third node mastery of at least a second set of resources from said first set of resources in response to occurrence of a second set of circumstances; and
while mastery of said second set of resources is delegated to said third node, the second node causing lock requests received by said second node for resources in said second set of resources to be sent to said second node.

16. The method of claim 15 further comprising the step of the second node informing said first node that mastery of said second set of resources is delegated to said third node.

17. A computer-readable medium carrying instructions for managing a set of one or more resources that are accessible to a plurality of entities, the instructions including instructions for performing the steps of:
providing a plurality of resource masters for said set of one or more resources; wherein said plurality of resource masters for said set of one or more resources include a primary master for said set of one or more resources and one or more secondary resource masters for said set of one or more resources;
dividing said plurality of entities into a plurality of subgroups; and
assigning each subgroup of said plurality of subgroups to a corresponding resource master of said plurality of resource masters;
wherein an entity of said plurality of entities, upon seeking access to a resource in said set of one or more resources, requests a lock on said resource from the resource master that is assigned to the entity subgroup that includes said entity;
wherein each secondary resource master is assigned to a parent resource master; and
wherein a secondary resource master of said plurality of resource masters communicates with the parent resource master to which that secondary master is assigned for information regarding granting locks on said resource when information maintained by said secondary resource master is insufficient for said secondary resource master to determine whether a particular lock on said resource can be granted.

18. The computer-readable medium of claim 17 wherein each resource master of said plurality of resource masters resides in one entity of said plurality of entities.

19. The computer-readable medium of claim 17 wherein each secondary resource master continues to grant locks to the subgroup of entities assigned to the secondary resource master when its parent resource master is inoperative if the information contained at the secondary resource master is sufficient for said secondary resource master to determine whether locks on said resource can be granted.

20. The computer-readable medium of claim 17 wherein the step of dividing is performed based on at least one factor in a list of factors that include:
system configuration;
similarity of tasks performed by said entities;
locations of said entities; and
similarity of performance speed of said entities.

21. A computer-readable medium carrying instructions for mastering resources, the instructions including instructions for performing the steps of:
mastering a plurality of resources at a first node;
dynamically delegating to a second node mastery of at least a first set of resources from said plurality of resources in response to occurrence of a first set of circumstances;
while mastery of said first set of resources is delegated to said second node, the first node causing lock requests received by said first node for resources in said first set of resources to be sent to said second node; and
relinquishing mastery of said first set of resources from said second node to said first node in response to occurrence of a second set of circumstances.

22. The computer-readable medium of claim 21 wherein the first set of circumstances includes that said second node has obtained a set of locks for resources in said first set of resources.

23. The computer-readable medium of claim 22 wherein the first set of circumstances includes that said second node has obtained a set of exclusive locks for resources in said first set of resources.

24. A computer-readable medium carrying instructions for mastering resources, the instructions including instructions for performing the steps of:
mastering a plurality of resources at a first node;
dynamically delegating to a second node mastery of at least a first set of resources from said plurality of resources in response to occurrence of a first set of circumstances;
while mastery of said first set of resources is delegated to said second node, the first node causing lock requests received by said first node for resources in said first set of resources to be sent to said second node;
wherein the first set of circumstances includes that said second node has obtained a set of exclusive locks for resources in said first set of resources and
wherein the first set of circumstances includes that the number of exclusive locks obtained by said second node on resources in said first set of resources exceeds a threshold.

25. A computer-readable medium carrying instructions for mastering resources, the instructions including instructions for performing the steps of:
mastering a plurality of resources at a first node;
dynamically delegating to a second node mastery of at least a first set of resources from said plurality of resources in response to occurrence of a first set of circumstances;

while mastery of said first set of resources is delegated to said second node, the first node causing lock requests received by said first node for resources in said first set of resources to be sent to said second node; and selecting how many resources to include in said first set based on a threshold number.

26. A computer-readable medium of carrying instructions for mastering resources, the instructions including instructions for performing the steps of:

mastering a plurality of resources at a first node;

dynamically delegating to a second node mastery of at least a first set of resources from said plurality of resources in response to occurrence of a first set of circumstances;

while mastery of said first set of resources is delegated to said second node, the first node causing lock requests received by said first node for resources in said first set of resources to be sent to said second node; and wherein:

prior to delegating mastery of said first set of resources to said second node, a single lock covers said plurality of resources; and the computer-readable medium includes instructions for breaking said single lock into a plurality of locks to delegate mastery of said first set of resources to said second node.

27. The computer-readable medium of claim 26 further comprising instructions for determining how to break said single lock into a plurality of locks based on a threshold number.

28. The computer-readable medium of claim 27 further comprising instructions for breaking the single lock into locks that cover said threshold number of resources when said single lock can be broken into locks that cover said threshold number of resources.

29. The computer-readable medium of claim 21 wherein the second set of circumstances includes that a set of one or more exclusive locks are released on said first set of resources.

30. The computer-readable medium of claim 21 wherein:

when mastery is relinquished to the first node, the first set of resources is covered by a first lock; and the computer-readable medium further comprises instructions for combining the first lock with a second lock that covers a second set of resources to produce a single lock that covers both the first set of resources and the second set of resources.

31. A computer-readable medium carrying instructions for mastering resources, the instructions including instructions for performing the steps of:

mastering a plurality of resources at a first node;

dynamically delegating to a second node mastery of at least a first set or resources from said plurality of resources in response to occurrence of a first set of circumstances;

while mastery of said first set of resources is delegated to said second node, the first node causing lock requests received by said first node for resources in said first set of resources to be sent to said second node; and further comprising instructions for performing the following steps after dynamically delegating mastery of the first set of resources to the second node:

dynamically delegating to a third node mastery of at least a second set of resources from said first set of resources in response to occurrence of a second set of circumstances; and while mastery of said second set of resources is delegated to said third node, the second node causing lock requests received by said second node for resources in said second set of resources to be sent to said second node.

32. The computer-readable medium of claim 31 further comprising instructions for said second node informing said first node that mastery of said second set of resources is delegated to said third node.

* * * * *

UNITED STATES PATENT AND TRADEMARK OFFICE
CERTIFICATE OF CORRECTION

PATENT NO. : 6,697,901 B1　　　　　　　　　　　　　　　　　　　　　　　Page 1 of 1
DATED : February 24, 2004
INVENTOR(S) : Wilson Wai Shun Chan It is certified that error appears in the above-identified patent and that said Letters Patent is hereby corrected as shown below:

<u>Column 14,</u>
Line 27, "master ink" should read -- mastering --.

Signed and Sealed this

Fifteenth Day of June, 2004

JON W. DUDAS
*Acting Director of the United States Patent and Trademark Office*